Sept. 27, 1960          E. R. ZIEGLER          2,953,803
WINDSHIELD CLEANING SYSTEM
Filed May 19, 1958          3 Sheets-Sheet 1
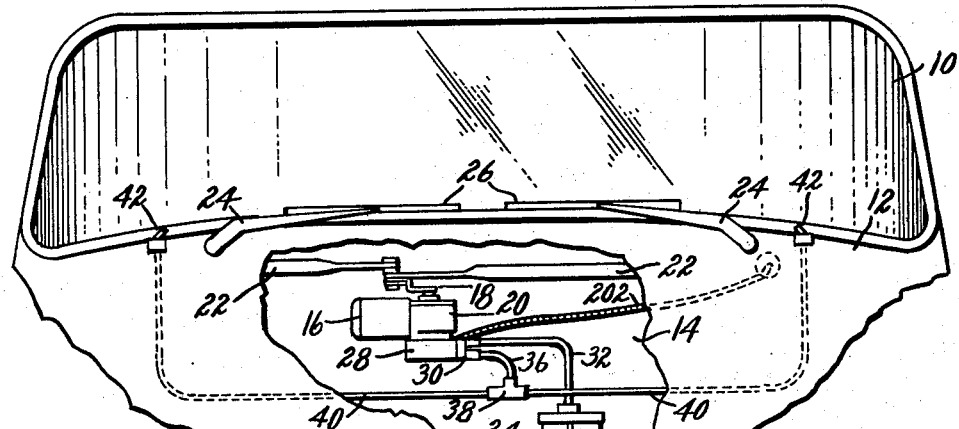
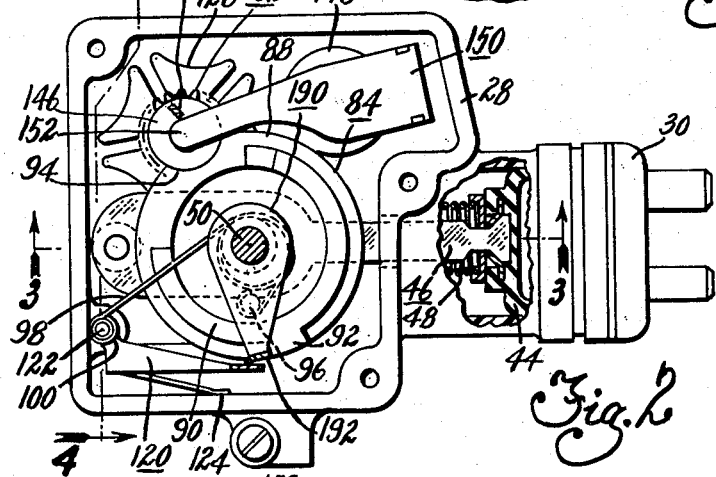
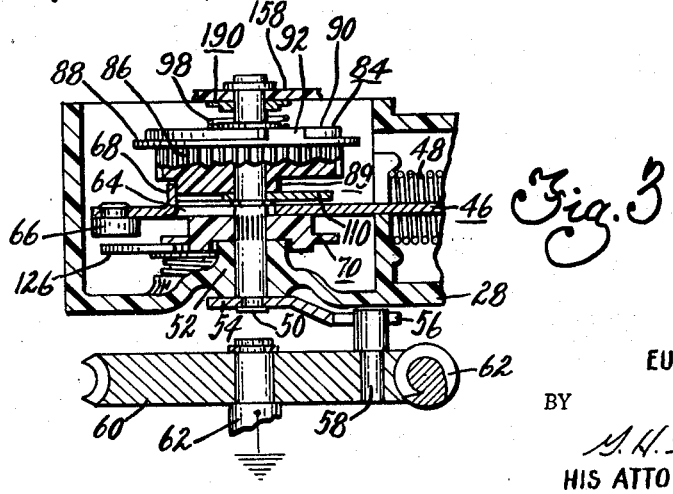
INVENTOR.
EUGENE R. ZIEGLER
BY
*M. H. Strickland*
HIS ATTORNEY

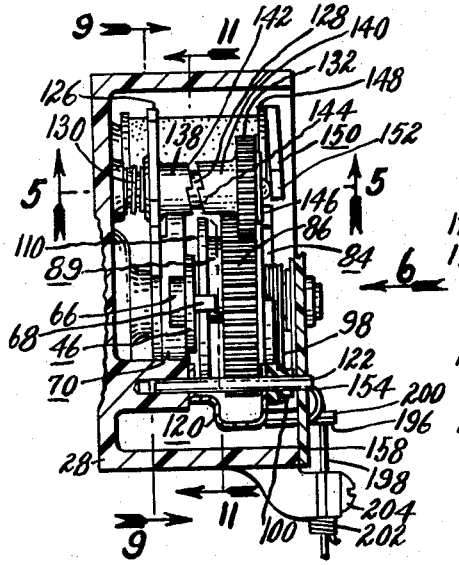
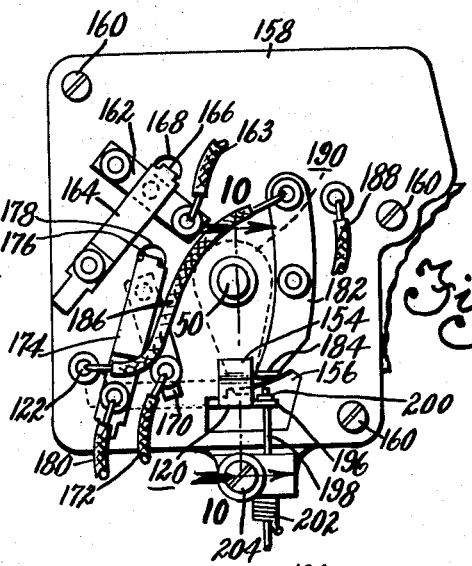
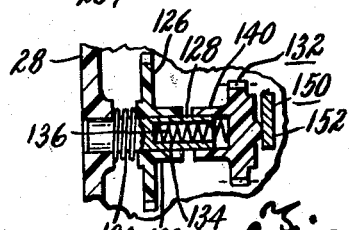
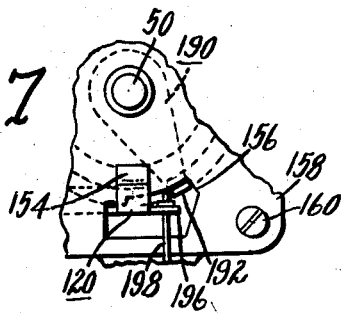
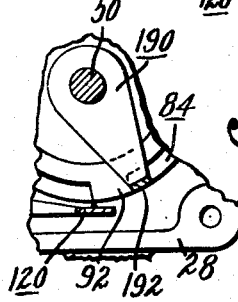
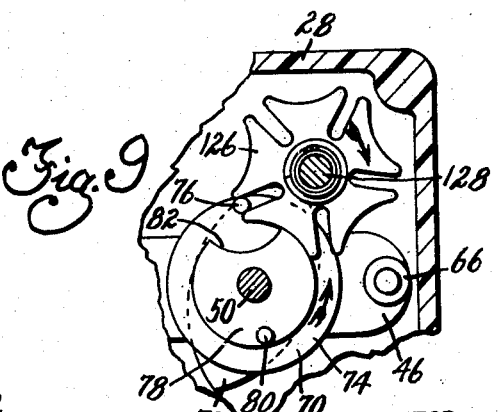
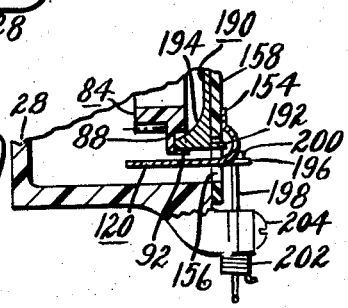
INVENTOR.
EUGENE R. ZIEGLER
BY
G. H. Strickland
HIS ATTORNEY

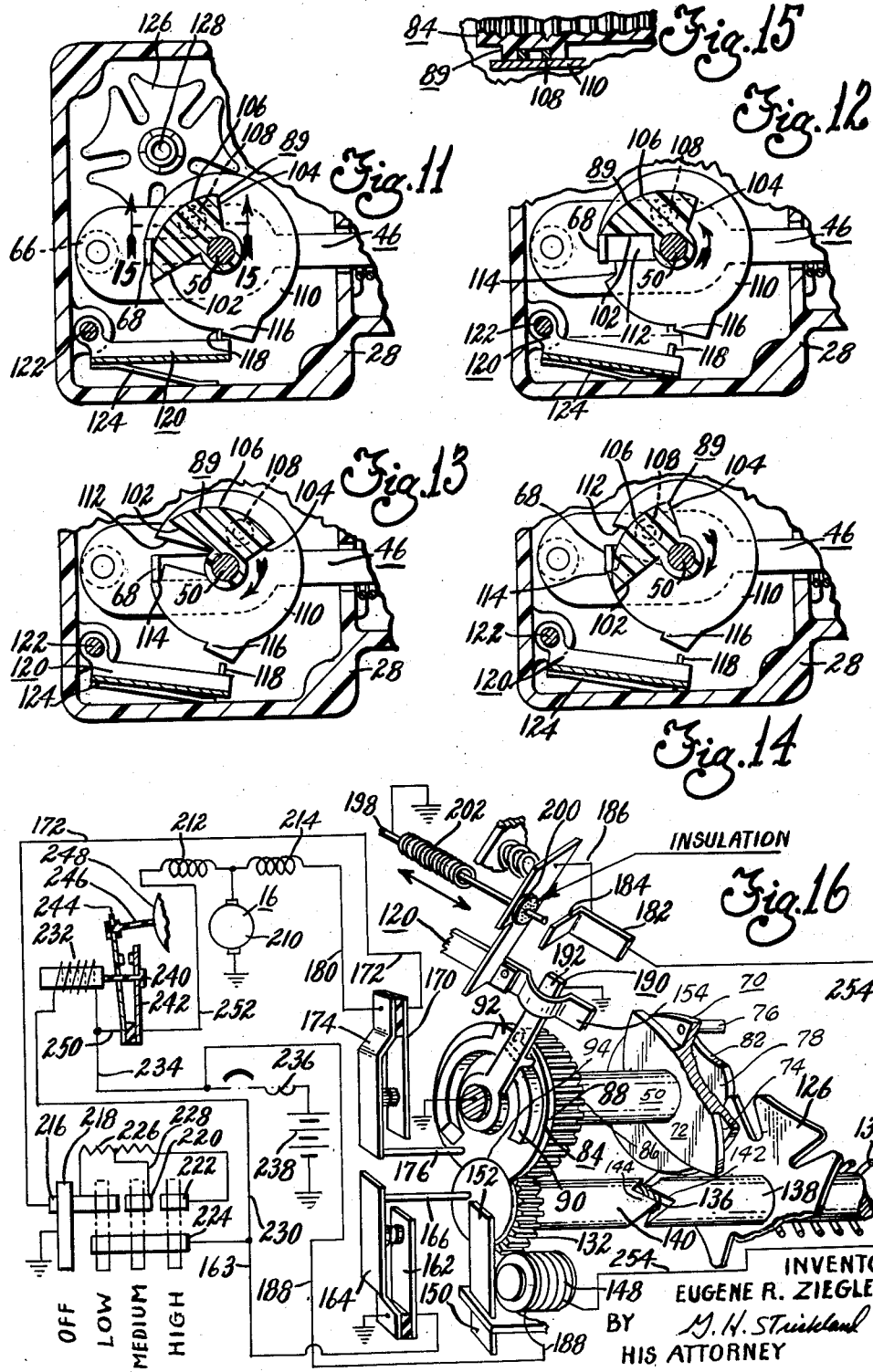

United States Patent Office 2,953,803
Patented Sept. 27, 1960

2,953,803
WINDSHIELD CLEANING SYSTEM

Eugene R. Ziegler, Spencerport, N.Y., assignor to General Motors Corporation, Detroit, Mich., a corporation of Delaware Filed May 19, 1958, Ser. No. 736,218

20 Claims. (Cl. 15—250.02)

This invention pertains to windshield cleaning systems, and particularly to a system including a wiper unit and a washer unit which can be operated conjointly.

In my copending application Serial No. 708,103, filed January 10, 1958, a windshield cleaning system is disclosed comprising a wiper unit and a washer unit operated by a single motor having programing means which automatically determine the duration of the automatic cleaning cycle, and wherein the automatic cleaning cycle can be restarted at any time during its operation. However, in some instances it is desirable to conserve the supply of liquid solvent and yet maintain a clear field of vision, such as when driving behind a vehicle which splatters dirt on the windshield. In order to obtain a clear field of vision with a minimum use of liquid solvent the wiper unit can be operated continuously while the washer unit is intermittently operated. The present invention relates to improved mechanism of the type disclosed in the aforementioned copending application wherein the windshield cleaning system can be operated throughout automatic washing and drying cycles, or the wiper unit can be operated continuously with the washer unit being operated intermittently to supply liquid solvent onto the windshield whereby liquid solvent will be delivered to the windshield during a first predetermined number of strokes of the wiper unit after which the wiper unit will operate for a second predetermined number of strokes. This intermittent washer unit operation and continuous wiper unit operation will continue as long as the washer control remains in the intermittent wash position.

Accordingly, among my objects are the provision of a windshield cleaning system including a washer unit and a wiper unit together with means for effecting continuous operation of the wiper unit and intermittent operation of the washer unit; the further provision of a windshield cleaning system of the aforesaid type including means for effecting conjoint operation of both units for an automatic cleaning cycle and means for effecting continuous operation of the wiper unit and intermittent operation of the washer unit; the further provision of control means for a windshield cleaning system of the aforesaid type having a single motor for operating both units including programing means having an interruptible driving connection with the motor; and the still further provision of a windshield cleaning system of the aforesaid type including an electric motor for operating both units and a pair of control circuits for controlling the energization of the motor under the control of the washer unit for effecting either an automatic cleaning cycle or continuous operation of the wiper unit with intermittent operation of the washer unit.

The aforementioned and other objects are accomplished in the present invention by utilizing a program disc which is biased in one direction by a torsion spring and movable in the opposite direction through an intermittent drive, together with means for automatically recycling the program disc during continuous operation of the wiper unit and intermittent operation of the washer unit.

Specifically, the wiper unit may be of the type disclosed in copending application Serial No. 718,789, filed March 3, 1958, in the name of Contant et al. and assigned to the assignee of this invention. Thus, the wiper unit includes a unidirectional electric motor having continuous driving connection with a variable throw crank assembly. During normal operation of the wiper unit, the throw of the crank assembly remains fixed, so that the wiper blades are oscillated throughout a running stroke, the inboard stroke end of which is above the cowl of the vehicle. When the throw of the crank assembly is automatically adjusted by turning the wiper unit off, the stroke of the wiper blades is increased and the blades move to a parked position against the cowl of the vehicle.

The washer unit includes an intermittent squirt type pump having an interruptible driving connection with the wiper motor, such that upon operation of the pump liquid solvent is discharged onto the windshield in timed relation with the stroking movement of the wiper blades thereacross. The pump includes a reciprocable rod having a pair of oppositely extending cam followers, one of which is engageable with a two lobe cam that is continuously rotated by the wiper motor. The other cam follower is engageable with a lockout cam formed on a program disc. The two lobe cam also imparts intermittent rotary movement to a Geneva wheel, and the Geneva wheel is clutchable to a pinion gear having toothed engagement with the program disc. The driving connection between the pinion gear and the Geneva wheel can be established by energization of an electromagnet.

When the program disc is in the "off" position, the driving connection between the Geneva wheel and the pinion gear is interrupted, and likewise, the driving connection between the pump actuating cam and the pump is interrupted by the lockout cam. The program disc is biased by a torsion spring to a starting position, and in the "off" position of the program disc, movement of the program disc under the urge of a torsion spring is precluded by the pinion gear. Upon energization of the electromagnet to effect an automatic cleaning cycle, the pinion gear is disengaged from the program disc thereby permitting the torsion spring to move the program disc to the starting position. At the same time, the wiper motor is automatically energized so that the washer unit and the wiper unit operate conjointly for a predetermined number of wiper strokes during which liquid solvent is applied to the windshield by the washer pump. When operation of the washer pump is automatically arrested by the lockout cam of the program disc, the wiper motor continues to operate until the program disc returns to the "off" position, this period constituting a drying cycle during which the wiper unit is operated for a second predetermined number of strokes. When the program disc is returned to the "off" position the wiper unit will be automatically deenergized with the wiper blades in the parked position.

The program disc carries a small permanent magnet for controlling the position of a steel pump control disc journalled coaxially with the program disc. During an automatic cleaning cycle, the steel disc is latched in a fixed position. However, during continuous wiper unit operation with intermittent washer unit operation, the steel disc is unlatched and is movable between predetermined positions due to the magnetic attraction between the steel disc and the permanent magnet carried by the program disc. The steel disc automatically engages one of the followers on the pump rod to interrupt operation of the pump after two delivery strokes thereof. Thereafter, the wiper unit will complete sixteen strokes during which time the program disc will be moved towards the "off" position. However, just prior to the return of the program disc to the "off" position a switch is closed so as to energize the electromagnet, and thus allow the torsion spring to return the program disc to the starting position. Accordingly, continuous wiper unit operation with intermittent washer unit operation will continue as long as the manual control remains in the intermittent wash position.

Further objects and advantages of the present invention will be apparent from the following description, reference being had to the accompanying drawings, wherein a preferred embodiment of the present invention is clearly shown.

In the drawings:

Figure 1 is a fragmentary view, with certain parts broken away, of a vehicle equipped with the windshield cleaning system of this invention.

Figure 2 is a view, partly in section and partly in elevation, of the washer pump and control mechanism with the cover and switch assembly removed.

Figure 3 is a fragmentary sectional view taken along line 3—3 of Figure 2.

Figure 4 is a fragmentary sectional view taken along line 4—4 of Figure 2.

Figure 5 is a fragmentary sectional view taken along line 5—5 of Figure 4.

Figure 6 is a fragmentary view in elevation, taken in the direction of arrow 6 of Figure 4.

Figure 7 is a fragmentary view, in elevation, depicting the relative location of the several parts in the "starting" position of the program disc.

Figure 8 is a view, partly in section and partly in elevation, similar to Figure 7 with the cover and switch assembly removed.

Figure 9 is a fragmentary view, partly in section and partly in elevation, taken along line 9—9 of Figure 4.

Figure 10 is a fragmentary sectional view taken along line 10—10 of Figure 6.

Figure 11 is a fragmentary sectional view taken along line 11—11 of Figure 4 with the program disc in the "off" position.

Figure 12 is a fragmentary view similar to Figure 11 depicting the relative positions of the parts in the "starting" position during intermittent washer unit and continuous wiper unit operation.

Figure 13 is a fragmentary view similar to Figure 11 depicting the relative location of the parts after the washer unit has been arrested during intermittent washer unit operation and continuous wiper unit operation.

Figure 14 is a fragmentary view similar to Figure 11 just before the program disc has been returned to the "off" position.

Figure 15 is a fragmentary sectional view taken along line 15—15 of Figure 11.

Figure 16 is a combined electric schematic and diagrammatic view illustrating the circuits for energizing the wiper unit alone, energizing the wiper unit and the washer for an automatic cycle of conjoint operation, or for energizing the wiper unit for continuous operation and the washer unit for intermittent operation.

With particular reference to Figure 1, a vehicle is shown having a windshield 10, a cowl 12 and a firewall 14. The vehicle includes a wiper unit comprising a unidirectional electric motor 16 suitably attached to the firewall 14 and having a continuous driving connection with a crank assembly 18 through a gear reduction unit 20. The inner ends of drive links 22 are pivotally connected to the crank assembly 18, the outer ends of the drive links being operatively connected at spaced pivot shafts, not shown, which carry wiper arms 24. The wiper arms carry wiper blades 26 which are oscillatable over asymmetric paths across the outer surface of the windshield 10.

The wiper unit may be of the type disclosed in the aforementioned copending application, Serial No. 718,789, and thus the crank assembly 18 is of the variable throw type. During normal operation of the wiper unit, the throw of the crank assembly 18 is fixed, and the wiper blades are oscillated throughout a wiping stroke, the inboard end of which is above the cowl 12 of the vehicle. The throw of the crank assembly is automatically varied upon movement of a manual wiper unit control switch to the "off" position, so that the wiper blades are moved to a depressed parked position against the vehicle 12, as shown in Figure 1, and when the blades 26 arrive at the depressed parked position the wiper motor 16 is automatically deenergized in a manner to be described.

The windshield cleaning system also includes a washer unit comprising a pump and control housing assembly 28 attached to the gear reduction housing. The pump is connected through a check valve assembly 30 to an intake conduit 32 which communicates with a reservoir 34 of liquid solvent. The check valve assembly 30 also connects with an outlet conduit 36 having a T-coupling 38 to which delivery conduits 40 are connected. The delivery conduits 40 are connected at their other ends with spaced nozzles 42 through which liquid solvent is discharged onto the windshield 10 into the paths of movement of the wiper blades 26.

With particular reference to Figures 2 through 11, the washer pump and control assembly includes an elastomeric bulb 44 having an open end, not shown, communicating with the check valve assembly 30. The closed end of the bulb 44 is connected to one end of a reciprocating pump rod 46. A portion of the pump rod 46 is encircled by a compression spring 48, the spring 48 constantly acting on the bulb 44 in a manner tending to collapse the bulb and effect the delivery stroke of the pump. The pump rod 46 extends through an opening in the side wall of the housing 28 as shown in Figure 3. The housing 28 is composed of insulating material.

A metallic shaft 50 is rotatably supported in a boss 52 of the housing 28. A crank arm 54 is rigidly connected to the outer end of the shaft 50, the crank arm 54 having a slotted end as indicated by numeral 56 which receives a crank pin 58. The crank pin 58 is shown connected to a worm gear 60 driven by a worm 62. The worm and worm gear constitute a gear reduction unit and the worm is driven by a motor 16. The worm gear 60 is drivingly connected to a shaft 62, the shaft 62 being drivingly connected with the crank assembly 18. Accordingly, a complete revolution of the worm gear 60 will effect an inboard and outboard stroke of the wiper blades, and accordingly the crank arm 54 and the shaft 50 will be driven in timed relation with the stroking movement of the wiper blades.

The pump rod 46 has an elongated longitudinal slot 64 through which the shaft 50 extends. The slot 64 in the pump rod 46 enables reciprocation of the pump rod relative to the shaft 50 so as to actuate the bellows 44. The other end of the pump rod 46 has a roller-type follower 66 attached thereto extending downwardly as viewed in Figure 3, and also has an upstanding intermediate lug-type follower 68.

A Geneva wheel drive disc and cam assembly 70, composed of insulating material, is drivingly connected with the shaft 50 as shown in Figure 3. The assembly 70, as shown in Figure 9, includes a two lobe cam 72, a flange 74 having a Geneva wheel drive pin 76, and a hub portion 78 having a locating pin 80. The hub portion 78 has an arcuate cut-out 82 aligned with the drive pin 76.

A program disc 84, composed of insulating material, is rotatably journalled on the shaft 50 and maintained in axially spaced relation relative to the cam and disc assembly 70. The pump rod 46 is disposed between the cam and disc assembly 70 and the program disc 84. The disc 84 has a toothed peripheral portion 86 as shown in Figure 3, a flange 88 of greater diameter than the toothed periphery 86, a lockout cam 89, a face cam 90 and a lug 92. The flange 88 has an arcuate cut-out 94 which determines the "off" position of the program disc 84. The program disc 84 is also formed with an upstanding pin 96 to which one end of a torsion spring 98 is attached, the torsion spring encircles the shaft 50, and the other end is attached to an insulating lug 100 carried by a pin 122. The torsion spring 98 is stressed in Figure 2 and, when the program disc is released, the torsion spring 98 will effect counterclockwise rotation of the program disc 84 as viewed in Figures 2 and 11 to the position of Figure 12.

The lockout cam 89, as shown in Figure 11, subtends an angle of substantially 120° and is formed with abrupt end surfaces 102 and 104 and a smooth outer eccentric surface 106. A small permanent magnet 108 is imbedded in the lockout cam 89, and the function of this permanent magnet will be described hereinafter. The upstanding lug 68 of the pump rod 46 engages the eccentric surface 106 of the lockout cam 89 when the program disc 84 is in the "off" position as shown in Figures 2 and 11. When the lug 68 engages the lockout cam 89, the spring 48 cannot collapse the bulb 44 so as to effect the delivery stroke of the washer pump.

A steel disc 110 is rotatably journalled on the shaft 50 and is maintained in spaced axial relation with respect to the pump rod 46. As seen in Figure 12, the disc 110 has a radial slot 112, a notch 114 and a peripheral abutment 116. The peripheral abutment 116 is engageable with an upstruck tang 118 of a yoke-type latch arm 120. The latch arm 120 is pivotally mounted by means of a pin 122 in the housing 28, and is normally urged towards the disc 110 by a leaf spring 124. During operation of the washer unit and the wiper unit for an automatic cleaning cycle, the disc 110 is retained in the position shown in Figure 11 by the tang 118 on the latch arm 120. In this position, the radial slot 112 is aligned with the lug 68 of the pump rod 46 so as to permit reciprocation of the pump rod 46 relative thereto when the lockout cam 89 is disengaged from the lug 68. The roller-type follower 66 on the pump rod 46 is adapted to engage the two lobe cam 72 on the cam and disc assembly 70.

A Geneva wheel 126, composed of insulating material, is rotatably journalled on a shaft 128 rigidly attached to the housing 28. The Geneva wheel 126 is biased into engagement with the cam and disc assembly 70 by a spring 130 such that during each revolution of the cam and disc assembly 70 in the counterclockwise direction as viewed in Figure 9, the Geneva wheel 126 will be moved 72° in the clockwise direction by engagement of the drive pin 76 with one of the slots in the Geneva wheel 126.

A pinion gear 132, composed of insulating material, is also rotatably journalled on the shaft 128. The shaft 128 is formed with a central recess 134 within which a coil spring 136 is disposed. The spring 136 normally biases the pinion gear 132 to the position shown in Figures 4 and 5. The Geneva wheel 126 includes a hub 138, and the pinion gear 132 includes a hub 140, the hubs 138 and 140 being formed with dog-toothed clutch surfaces 142 and 144, respectively, as shown in Figure 4. The spring 136 normally maintains the dog-toothed clutch surfaces 142 and 144 out of engagement so that intermittent rotary movement of the Geneva wheel 126 will not impart movement to the pinion gear 132.

As seen in Figure 2, the pinion gear 132 has a circular flange portion 146 which is snugly received in the cut-out 94 of the program disc 84 when the program disc 84 is in the "off" position. The flange 146 prevents rotation of the program disc 84 under the urge of the torsion spring 98 when it is engaged with the cut-out 94.

An electromagnet 148 is supported within the housing 28, the electromagnet including an armature 150 having an end portion 152 engageable with the pinion gear 132. The end portion 152 of the armature limits movement of the pinion gear 132 under the urge of spring 136, the spring 136 also functioning to move the armature out of engagement with the core of the electromagnet 148 when the electromagnet is deenergized.

When the electromagnet 148 is energized, the pinion gear 132 is moved to the left, as viewed in Figure 5, thereby disengaging the flange 146 from the cut-out 94 in the program disc 84 so as to allow the torsion spring 98 to rotate the program disc 84 in the counterclockwise direction throughout an angle of substantially 330° as viewed in Figure 2. Energization of the electromagnet 148 also engages the dog-toothed clutch 142 and 144 and compresses spring 130 so as to disengage the Geneva wheel 126 from the cam and disc assembly 70. As soon as the program disc 84 has been rotated in the counterclockwise direction, the electromagnet 148 can be deenergized since the flange 88 will maintain the pinion gear 132 in the depressed position wherein the dog-toothed clutch elements 142 and 144 are maintained in engagement by the spring 130. The locating pin 80 of the disc and cam assembly 70 will realign the Geneva wheel with respect to the drive pin 76 so as to reestablish the driving connection between the drive pin 76 and the Geneva wheel 126.

The pitch diameter of the pinion gear 132 is one-half the pitch diameter of the toothed periphery 86 on the program disc 84. Accordingly, a 72° movement of the pinion gear 132 will effect a 36° movement of the program disc 84. The Geneva wheel 126 is driven in the counterclockwise direction as viewed in Figure 2 so as to effect counterclockwise movement of the pinion gear 132 and clockwise movement of the program disc 84, as viewed in Figure 2.

The latch arm 120, as seen in Figures 4, 6 and 10, includes a hook-shaped end portion 154 which extends through a slot 156 in the switch plate 158 which is secured to the housing 28 by screws 160. A stationary leaf spring contact 162 is attached to the switch plate 158, which is composed of insulating material, the leaf spring contact 162 being connected to a wire 163. The leaf spring contact 162 can be engaged by movable leaf spring contact 164, one end of which is attached to the switch plate 158, and is electrically grounded, and the other end of which has an inwardly extending cam follower portion 166 extending through an aperture 168 in the switch plate 158. The cam follower portion 166 engages the end surface of the pinion gear 132 such that when the pinion gear 132 is aligned with the notch 94 in the program disc 84 as shown in Figure 2, the switch contact 164 is disengaged from the switch contact 162. However, when the pinion gear 132 is held in the depressed position by the electromagnet 148 or the flange 88 of the program disc 84, the switch contact 164 engages the switch contact 162.

A second stationary switch contact 170 is mounted on the switch plate 158 and connected to a wire 172. A second movable switch contact 174 is attached to the switch plate 158 at one end and is formed with a cam follower 176 at the other end which extends through an aperture 178 in the switch plate so as to be aligned with the face cam 90 on the program disc 84. The switch contact 174 is also connected to a wire 180. When the program disc 84 is in the "off" position as depicted in Figure 2, the resilient contact 174 engages the contact 170, and when the program disc moves to the starting position and throughout a predetermined portion of its movement back to the "off" position, the switch contact 174 is maintained out of engagement with the switch contact 170.

A terminal strip 182 is attached to the switch plate 158, one end of the terminal strip 182 having an upturned end 184 constituting a switch contact, and the other end of the terminal strip is attached to a wire 186. The wire 186 is connected to the pivot pin 122 which supports the latch arm 120. The winding of the electromagnet 148 has one end connected to the terminal strip 182 and the other end connected to a wire 188.

A metallic lever arm 190 is rotatably journalled on the shaft 50. The shaft 50, and hence the lever arm 190, is electrically grounded through the crank arm 54, the crank pin 58, the worm gear 60 and the shaft 62. The lever arm 190 has an upturned end portion 192 which extends through the slot 156 in the switch plate 158. The lever 190 also has an inwardly extending end portion 194 which rides on the flange 88 of the program disc 84 and is engageable with the lug 92. The lever 190 can be engaged by the latch arm 120 when the latch arm is moved in the clockwise direction about its pivot pin 122 to the position shown in Figure 12, since in so moving the latch arm 120 the end portion 154 of the latch arm engages the end 192 of the lever 190 when the program disc 84 is in the "off" position as seen in Figure 2.

The latch arm 120 is also formed with an apertured end portion 196 through which a Bowden control wire 198 extends. The Bowden control wire has a collar 200 of insulating material attached thereto such that downward movement of the Bowden control wire 198, as viewed in Figure 6, will pivot the latch arm 120 from the position of Figure 11 to the position of Figure 12. Upward movement of the Bowden control wire 198 will cause the end thereof to engage the contact portion 184 of the terminal strip 182. The Bowden wire is enclosed in a conduit 202 which is rigidly connected to the housing 28 by a screw 204, and the Bowden wire contact 184 and the Bowden wire 198 are electrically grounded.

With particular reference to Figure 16, the circuit arrangements for effecting operation of the wiper unit alone, conjoint operation of the wiper unit and the washer unit for an automatic cleaning cycle, or continuous operation of the wiper unit with intermittent operation of the washer unit, will be described. The electric motor 16 includes an armature 210 having one brush connected to ground and the other brush connected to the inner ends of a series field winding 212 and a shunt field winding 214. The outer end of the shunt field winding 214 is connected to the wire 180 which connects with the movable switch contact 174. The wire 172, which is connected to the stationary switch contact 170, is also connected with a stationary contact 216 of a manually operable wiper unit control switch. The manually operable wiper unit control switch includes movable bridging contact 218 which is connected to ground, as well as stationary contacts 216, 220, 222 and 224. Stationary contacts 216 and 222 are interconnected by a resistor 226 having a center tap 228 connected to the contact 220.

Stationary contact 224 is connected to the wire 163 and to a wire 230. Wire 230 connects with one end of relay coil 232, the other end of which is connected to a wire 234. Wire 234 is connected through a thermal overload switch 236 to one terminal of a battery 238, the other terminal of which is connected to ground. The relay coil 232 controls the position of a plunger 240 associated with a movable contact 242 of a wiper unit parking switch. The parking switch also includes a second movable contact 244 which carries a follower 246 engageable with a cam 248, the cam 248 only engaging the follower 246 so as to separate switch contacts 242 and 244 when the relay coil 232 is deenergized and the wiper blades are in the depressed parked position, as shown in Figure 1. The switch contact 244 is connected to the wire 234 by a wire 250, and the switch contact 242 is connected to the other end of the series field winding 212 by a wire 252.

The switch contacts 170 and 174 control the energization of the shunt field winding 214 during operation of the washer unit during both an automatic cleaning cycle and continuous wiper operation and intermediate washer operation. Thus, when the follower 176 on the switch contact 174 engages the face cam 90 of the program disc 84, the contacts 170 and 174 will be disengaged so as to open circuit the shunt field winding 214 whereupon the motor 16 will operate at high speed when the series field winding and the armature are energized. The switch contacts 164 and 162 constitute an "on"–"off" switch for controlling energization of the motor 16 independently of the manual wiper unit control switch. Thus, when the pinion gear 132 is maintained in a depressed position by the flange 88 on the program disc 84, switch contacts 162 and 164 will be in engagement since switch contact 164 is biased toward switch contact 162 and upon movement of the pinion gear 132 to the right, as viewed in Figure 16, the follower 166 will move to the right so as to cause engagement of these contacts. The wire 188 is shown connected between one end of the coil of electromagnet 148 and the wire 234, the other end of the coil of the electromagnet is shown schematically as being connected by a wire 254 to the terminal strip 182. The terminal strip 182 and the latch arm 120 are connected by the wire 186.

Operation of the wiper motor alone under the control of the manual switch is as follows. When the movable bridging contact 218 is moved to the low speed position as indicated by the dotted line in Figure 16, the relay coil 232 is energized from the battery 238 through the overload switch 236 and wire 234, the coil 232, the wire 230, the switch contact 224 and the switch contact 218. Accordingly, the plunger 240 will move to the left as viewed in Figure 16 thereby moving the switch contact 242 into engagement with the switch contact 244. When the contacts 242 and 244 are in engagement, the motor 16 will be energized from the battery, through overload switch 236, wires 234 and 250, switch contacts 244 and 242, wire 252, series field winding 212, and the armature 210. The shunt field winding 214 will be fully energized from the series field winding 212 through wire 180, switch contacts 170 and 174, wire 172, and contacts 216 and 218. Accordingly, the motor 16 will operate at low speed and the wiper blades 26 will be moved throughout their wiping strokes.

To operate the wiper motor 16 at an intermediate speed, the bridging contact 218 is moved to the dotted line position wherein it bridges contacts 220 and 224. Under these conditions, a portion of the resistor 226 is connected in series with the shunt field winding 214 so as to reduce the energization thereof and thus increase the motor speed. To operate the wiper motor at high speed, the bridging contact 218 is moved so as to bridge contacts 222 and 224 wherein the entire resistor 226 is connected in series with the shunt field winding 214. Accordingly, the energization of the shunt field winding 214 is further reduced so as to further increase the speed of the motor 16. When the bridging contact 218 is moved from any of the "on" positions to the "off" positions, the motor 16 will continue to be energized for low speed rotation and the throw of the crank assembly will be automatically varied. The motor 16 will continue to be energized since movement of the bridging contact 218 to the "off" position only deenergizes the relay coil 232. However, the contacts 244 and 242 are normally biased into engagement with each other, and thus the energizing circuit for the motor will remain completed. When the wiper blades arrive at the depressed parked position, the cam 248 will engage the follower 246 so as to separate contacts 242 and 244 whereupon the motor 16 will be deenergized.

In order to effect an automatic cleaning cycle, the Bowden control wire 198 is momentarily depressed so that the end thereof engages the switch contact 184 of the terminal strip 182. The Bowden wire 198 can be connected to any suitable knob, not shown, which is spring biased to the "off" position, so that upon depression of the button the Bowden control wire 198 will be moved into engagement with the terminal strip 182 and upon release thereof it will automatically be disengaged therefrom. When the Bowden control wire 198 engages the terminal strip 182, a circuit is completed from the battery 238 through overload switch 236, the wire 188, the wire 254 and the terminal strip 182 to ground for energizing the coil of the electromagnet 148.

Upon energization of the electromagnet 148 the armature 150 moves into engagement with the core and the end 152 moves the pinion gear to the right, as viewed in Figure 16. When the pinion gear 132 is depressed, the Geneva drive is disassociated so that the torsion spring 98 immediately imparts counterclockwise rotation to the program disc 84 throughout substantially 330° from the position of Figure 11 to the position of Figure 12 wherein edge 102 of the lockout cam 89 abuts the side of the lug 68. During this movement of the program disc 84, the lug 68 is disengaged from the lockout cam 89 thereby enabling the spring 48 to compress the bulb 44 and effect a delivery stroke of the washer pump since the low point of the cam 72 is aligned with the follower 66 as seen in Figure 9. Upon movement of the pinion gear 132 to the right as viewed in Figure 16, the switch contact 164 will engage the switch contact 162 so as to energize the relay coil 232 whereupon the wiper motor 16 will be energized. Since rotation of the program disc 84 results in engagement of the follower 176 with the face cam 98, the switch contacts 170 and 174 will be separated so that the shunt field winding 214 will be open circuited, and hence the wiper motor will rotate at high speed.

Rotation of the wiper motor 16 will cause rotation of the worm gear 60 and hence the crank arm 54, the shaft 50, and the disc assembly 70. If the Geneva wheel 126 has been misaligned with respect to the disc 70, the locating pin 80 will realign it such that during counter-clockwise rotation of the disc assembly 70, as viewed in Figure 9, the Geneva wheel 162 will have imparted thereto a 72° clockwise movement during each revolution of the disc assembly 70. Moreover, during each revolution of the disc assembly 70 the wiper blades will complete two strokes, and the washer pump will be operated through two intake strokes and two delivery strokes in timed relation with stroking movement of the wiper blades. The stroke counting means comprising the Geneva wheel 126 will move the program disc 84 in the clockwise direction towards its "off" position, as viewed in Figure 2, throughout 36° during each revolution of the disc assembly 70, and hence during each two strokes of the wiper blades. Since the lockout cam 89 subtends an angle of substantially 120°, it will require six revolutions of the disc assembly 70, or twelve strokes of the wiper blades, before the program disc 84 returns to an angular position wherein the lug 68 reengages the lockout cam 88 so as to automatically arrest operation of the washer unit. Thereafter, the wiper unit will continue to operate alone for a drying cycle of eight wiper strokes before the program disc 84 is returned to the "off" position at which time the spring 136 will move the pinion gear to the left as viewed in Figure 16, into the cutout 94 thereby interrupting the driving connection between the pinion gear 132 and the Geneva wheel 126 and locking the program disc 84 in the "off" position.

Several wiper strokes prior to the return of the program disc 84 to the "off" position, the follower 176 is disengaged from the face cam 90 permitting contacts 170 and 174 to reengage whereupon the wiper motor 16 will be energized for low speed operation. When the program disc 84 returns to the "off" position, the pinion gear 132 moves into engagement with the cut-out 94, the switch contacts 162 and 164 are disengaged whereupon the relay 232 will be deenergized. Accordingly, the wiper motor 16 will automatically park the wiper blades 26 in the depressed parked position as shown in Figure 1, and when the blades arrive in this position the wiper motor will be automatically deenergized by the opening of parking switch contacts 242 and 244. Thus, during an automatic cleaning cycle of the wiper unit and the washer unit operate conjointly for a predetermined number of strokes, in this instance twelve wiper strokes, after which the washer unit is automatically arrested and the wiper unit continues to operate for a second predetermined number of wiper strokes, in this instance eight, after which the wiper unit is automatically deenergized with the wiper blades in the parked position.

In order to obtain continuous operation of the wiper unit and intermittent operation of the washer unit, the Bowden wire 198 is pulled and remains in this position until it is manually returned to the "off" position. Upon pulling of the Bowden wire 198, the latch arm 120 is moved about its pivot pin 122 from the position of Figure 11 to the full line position of Figure 12. Accordingly, the abutment 118 is disengaged from the shoulder 116 on the disc 110. At the same time, the end portion 154 of the latch arm 120 engages the end 192 of the lever arm 190. Since the lever arm 190 is electrically grounded, as aforedescribed, the latch arm 120 is electrically grounded as is the terminal 182. Accordingly, the electromagnet 148 will be energized from the battery through overload switch 236, wire 188 of the coil electromagnet, the wire 254, as seen in Figure 16, the terminal strip 182, the wire 186, the latch arm 120, and the lever arm 190. Therefore, the pinion gear 132 will be moved to the right by the armature 150, as viewed in Figure 16, permitting the torsion spring 98 to rotate the program disc in the counterclockwise direction, as viewed in Figure 2, throughout substantially 330°. During this movement, the lug 92 will engage the left hand side of the lever arm 190 as shown in Figures 7 and 8, so as to move the end 192 out of engagement with the latch arm 120.

Therefore, the electromagnet 148 will be deenergized, since the pinion gear 132 is maintained in the depressed position by the flange 88 of the program disc 84, the wiper motor 16 will remain energized through engaged contacts 162 and 164. Accordingly, rotation will be imparted to the disc assembly 70 and the washer pump will effect a delivery stroke since the roller 66 is aligned with the low point of the cam 72. During continued rotation of the disc assembly 70 and operation of the wiper units, the drive pin 76 will engage the Geneva wheel and impart clockwise rotation to the Geneva wheel 126 throughout an angle of 72°. Prior to engagement of the drive pin 76 with the Geneva wheel 126, the washer pump will have completed two delivery strokes and the high point of the cam 72 will be approaching the follower 66, such that during rotation of the Geneva wheel 126 the lug 68 will be aligned with the notch 114 in the disc 110. As the Geneva wheel 126 rotates throughout 72°, thereby imparting rotation throughout the pinion gear 132 to the program disc 84, throughout 36° in the clockwise direction as viewed in Figure 12, the disc 110 will rotate with the program disc 84 due to the magnetic attraction between the disc 110 and the permanent magnet 108. Movement of the disc 110 will be arrested since the lug 68 engages the end of the notch 114, so that operation of the washer unit will be arrested after two delivery strokes of the washer pump. This operation is termed intermittent operation of the washer unit.

During continued movement of the program disc towards the "off" position, the washer unit will remain inactive since the lug 68 is restrained against movement by the disc 110. Just before the program disc 84 returns to the "off" position, the lockout cam 89 will have lifted the lug 68 out of engagement with the disc 110, as shown in Figure 14. At the same time, the lug 92 engages the right hand side of the lever arm 190, as seen in Figures 7 and 8, so as to reengage the end portion 192 with the latch arm 120, thereupon the electromagnet 148 will be reenergized thereby permitting the torsion spring 98 to return the program disc to the starting position. During continuous wiper unit operation with intermittent washer unit operation, the washer pump will be operative to deliver liquid solvent onto the windshield during two strokes of the wiper unit, during the remaining sixteen strokes of the wiper unit required to return the program disc 84 to a position adjacent the "off" position, the washer unit will be inoperative. The two units will be automatically recycled after the wiper unit completes eighteen strokes as long as the Bowden wire 198 remains in the outward position wherein the latch arm 120 is disengaged from the disc 110. As soon as the Bowden wire 198 is pushed inwardly to the "off" position, operation of the wiper unit will be automatically arrested when the program disc 84 is returned to the "off" position as shown in Figure 2.

After a cycle of continuous wiper unit operation and intermittent washer unit operation, the disc 110 will remain in the position shown in Figure 14 until the electromagnet 148 is energized for either an automatic cycle or an intermittent cycle. When the electromagnet 148 is energized, the disc 110 will be returned to its normal position as shown in Figure 11 due to movement of the program disc 84 by the torsion spring 98. This will occur since the lockout cam 89 disengages the lug 68 from the disc 110 prior to returning of the program disc to the "off" position, such that movement of the disc 84 under the urge of the torsion spring will effect counterclockwise movement of the disc 110, from the position of Figure 14 to the position of Figure 12 due to the magnetic attraction causing friction between the disc 110 and the permanent magnet 108. In the position of Figure 11, the end 118 of the latch arm 120 can reengage the shoulder 116 when under the urge of leaf spring 124.

From the foregoing it is readily apparent that the present invention provides a unique windshield cleaning system wherein the wiper unit alone can be activated under manual control, wherein the wiper unit and the washer unit can be operated conjointly for an automatic cleaning cycle or for intermittent washer operation and continuous wiper operation.

While the embodiments of the invention as herein disclosed constitutes a preferred form, it is to be understood that other forms might be adopted.

What is claimed is as follows:

1. A windshield cleaning system including, a wiper unit, a washer unit, manually operable means for controlling independent operation of the wiper unit, and selectively operable means operable either to set both units in operation for a cycle of conjoint operation wherein the two units are arrested in a sequential order that prolongs wiper unit operation after washer unit operation has been arrested, or effect continuous operation of said wiper unit and automatic intermittent operation of said washer unit.

2. A windshield cleaning system including, a wiper unit, a washer unit, and selectively operable means operable either to set both units in operation for a cycle of conjoint operation in which both wiper unit operation and washer unit operation are predetermined and automatically arrested, or to effect continuous operation of the wiper unit and automatic intermittent operation of the washer unit.

3. A windshield cleaning system including, a wiper unit, a washer unit, control means having first and second positions, means operable to effect continuous operation of said wiper unit and automatic intermittent operation of said washer unit when said control means is in one of said positions, and means operable to effect conjoint operation of both units with the operation of both units being predetermined and automatically arrested when the control means is momentarily moved to the other position.

4. A windshield cleaning system including in combination, a wiper unit, a washer unit, a single motor having a continuous driving connection with said wiper unit and an interruptible driving connection with said washer unit, means operable to energize said motor to effect continuous wiper unit operation and establish the driving connection between said motor and said washer unit, and means actuated when said driving connection is established for periodically operating and interrupting the operation of said washer unit to obtain intermittent operation of the washer unit during continuous operation of the wiper unit.

5. A windshield cleaning system including, a wiper unit, a washer unit, a single motor having a continuous driving connection with said wiper unit and an interruptible driving connection with said washer unit, manually operable control means having a first position to energize said motor to effect continuous operation of said wiper unit and establish the driving connection between said motor and said washer unit, wiper unit stroke counting means operated continuously during operation of said wiper unit, and programing means actuated by said stroke counting means when said driving connection is established for controlling the operation of said washer unit whereby said washer unit will be sequentially operated and arrested during each period of operation of the wiper unit throughout a predetermined number of wiper unit strokes as long as said manually operable control means remains in said first position.

6. A windshield cleaning system including, a wiper unit, a washer unit, a single motor having a continuous driving connection with said wiper unit and an interruptible driving connection with said washer unit, control means having a first position to energize said motor to effect continuous operation of said wiper unit and establish the driving connection between said motor and said washer unit, wiper unit stroke counting means operated during operation of the wiper unit, programing means actuated by said stroke counting means when said driving connection is established for controlling the operation of said washer unit whereby the washer unit will be sequentially operated and arrested during each period of operation of the wiper unit throughout a predetermined number of wiper unit strokes, and means to automatically recycle said programing means after each period of operation of said wiper unit throughout said predetermined number of wiper unit strokes as long as said control means remains in said first position.

7. A windshield cleaning system including, a wiper unit, a washer unit, means to set both units in operation for conjoint operation with the wiper unit operated continuously, wiper unit stroke counting means actuated during conjoint operation of said units, and programing means actuated by said stroke counting means for controlling the operation of said washer unit whereby said washer unit will be sequentially operated and arrested during each period of operation of the wiper unit throughout a predetermined number of wiper unit strokes.

8. A windshield cleaning system including, a wiper unit, a washer unit, control means having a first position and a second position, for effecting conjoint operation of the wiper unit and the washer unit, wiper unit stroke counting means actuated during conjoint operation of said units, programing means actuated by said stroke counting means for controlling the operation of said washer unit whereby said washer unit will be sequentially operated and arrested during each period of operation of the wiper unit throughout a predetermined number of wiper unit strokes, and means for automatically recycling said programing means after each period of operation of said wiper unit throughout said predetermined number of wiper unit strokes when said control means remains in said first position.

9. The cleaning system set forth in claim 8 wherein said programing means includes cam means enabling continuous operation of said washer unit during a second predetermined number of wiper unit strokes and then automatically arresting said washer unit and continuing operation of said wiper unit for a third predetermined number of wiper unit strokes and then automatically arresting said wiper unit when said control means is momentarily moved to the second position.

10. A windshield cleaning system including, a wiper unit, a washer unit including a pump having an intake stroke and a delivery stroke, a single motor having continuous driving connection with said wiper unit and an interruptible driving connection with said washer unit, means operable to energize said motor to effect continuous operation of the wiper unit and establish the driving connection between said motor and said washer unit, programing means driven by said motor when said driving connection is established, and means actuated by said programing means for periodically establishing and interrupting a driving connection between said motor and said pump to obtain intermittent operation of said pump during continuous operation of said wiper unit.

11. A windshield cleaning system including, a wiper unit, a washer unit including, a pump having an intake stroke and a delivery stroke, a single motor having continuous driving connection with said wiper unit and an interruptible driving connection with said washer unit, means to energize said motor to effect continuous operation of the wiper unit and establish the driving connection between said motor and said washer unit, wiper unit stroke counting means operated by said wiper unit, and programing means actuated by said stroke counting means when said driving connection is established for periodically establishing and interrupting a driving connection between said pump and said motor during each period of operation of the wiper unit throughout a predetermined number of wiper unit strokes.

12. The windshield cleaning system set forth in claim 11 wherein said pump includes resilient means for effecting the delivery stroke thereof, and wherein the driving connection between said pump and said motor includes cam means driven by said motor for effecting the intake stroke thereof.

13. The windshield cleaning system set forth in claim 12 wherein said pump includes a rod having an upstanding lug, and wherein said programing means includes a disc having a slot and a shoulder whereby when the lug on said pump rod is aligned with the slot in said disc the driving connection between the pump and said motor is established and when said lug is aligned with the shoulder on said disc the driving connection between said pump and said motor is interrupted.

14. A windshield cleaning system including, a wiper unit, a washer unit, a single motor having a continuous driving connection with said wiper unit and an interruptible driving connection with said washer unit, said washer unit including a pump having an intake stroke and a delivery stroke, programing means for controlling operation of said pump including a movable control disc operable to interrupt the driving connection between said pump and said washer unit, means to energize said motor to effect continuous operation of the wiper unit and establish the driving connection between said motor and said washer unit, and wiper unit stroke counting means operated by said wiper unit for actuating said programing means when said driving connection is established whereby said washer pump will be sequentially operated and arrested during each period of operation of the wiper unit throughout a predetermined number of wiper unit strokes.

15. The windshield cleaning system set forth in claim 14 including latch means for preventing movement of said control disc, and means to energize said motor and establish the driving connection between said motor and said washer unit to set both units in operation for a cycle of conjoint operation wherein the units are arrested in a sequential order that prolongs wiper unit operation after washer unit operation has been arrested.

16. A windshield cleaning system including, a wiper unit, a washer unit, an electric motor having a continuous driving connection with said wiper unit and an interruptible driving connection with said washer unit, and a pair of circuits for energizing said motor including means for establishing the driving connection between said motor and said washer unit to effect conjoint operation of the wiper unit and the washer unit, said units being arrested in a sequential order that prolongs wiper unit operation after washer unit operation has been arrested when one of said circuits is energized, and said wiper unit being operated continuously and the washer unit being operated intermittently when the other of said circuits is energized.

17. A windshield cleaning system including, a wiper unit, a washer unit, an electric motor having a continuous driving connection with said wiper unit and an interruptible driving connection with said washer unit, means for energizing said motor to effect continuous operation of said wiper unit including means for establishing the driving connection between said motor and said washer unit, Geneva motion stroke counting means driven by said wiper unit, and programing means actuated by said stroke counting means when said driving connection is established for periodically actuating and interrupting the actuation of said washer unit during each period of operation of the wiper unit throughout a predetermined number of wiper unit strokes.

18. The windshield cleaning system set forth in claim 17 wherein said programing means includes a lockout cam thereon, and a control disc operatively associated with said lockout cam, and wherein said washer unit includes a pump having a reciprocable rod with an upstanding lug, said lug being engageable with the lockout cam and said control disc, and latch means engageable and disengageable with said control disc for controlling the position thereof.

19. The windshield cleaning system set forth in claim 18 wherein said control disc is composed of magnetic material, and wherein said lockout cam carries a permanent magnet for imparting movement of said control disc.

20. A windshield cleaning system including, a wiper unit, a motor having continuous driving connection with said wiper unit, stroke counting means driven by said wiper unit during operation thereof, a washer unit including a pump having an interruptible driving connection with said motor, a program disc having an interruptible driving connection with said stroke counting means, a pump control disc coaxial with said program disc, means establishing a driving connection between said pump control disc and said program disc to effect movement of said pump control disc to periodically establish and interrupt the driving connection between the pump and the motor, a latch engageable with said pump control disc for restraining movement of said pump control disc upon movement of said program disc, and means operable to simultaneously energize said motor to establish continuous operation of the wiper unit, establish the driving connection between said stroke counting means and said program disc, and release said latch whereby said pump will be sequentially operated and arrested during each period of operation of said wiper unit throughout a predetermined number of strokes.

References Cited in the file of this patent

UNITED STATES PATENTS

| | | |
|---|---|---|
| 2,206,814 | Horton | July 2, 1940 |
| 2,816,316 | Oishei | Dec. 17, 1957 |